United States Patent
Nagar et al.

(10) Patent No.: US 11,316,818 B1
(45) Date of Patent: Apr. 26, 2022

(54) CONTEXT-BASED CONSOLIDATION OF COMMUNICATIONS ACROSS DIFFERENT COMMUNICATION PLATFORMS

(71) Applicant: INTERNATIONAL BUSINESS MACHINES CORPORATION, Armonk, NY (US)

(72) Inventors: Raghuveer Prasad Nagar, Kota (IN); Lakshmi Bellave Ramesh, Bangalore (IN); Harshit Sharma, Hathras (IN); Jagadesh Ramaswamy Hulugundi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/412,963

(22) Filed: Aug. 26, 2021

(51) Int. Cl.
*H04L 51/56* (2022.01)
*H04L 51/046* (2022.01)
*H04L 51/063* (2022.01)

(52) U.S. Cl.
CPC .......... *H04L 51/36* (2013.01); *H04L 51/046* (2013.01); *H04L 51/063* (2013.01)

(58) Field of Classification Search
CPC ...... H04L 51/36; H04L 51/046; H04L 51/063
See application file for complete search history.

(56) References Cited

U.S. PATENT DOCUMENTS

| 7,133,851 | B1 | 11/2006 | Benson | |
|---|---|---|---|---|
| 7,222,156 | B2 * | 5/2007 | Gupta | G06F 40/169 715/752 |
| 7,487,214 | B2 * | 2/2009 | Qureshi | G06Q 10/107 709/206 |

(Continued)

OTHER PUBLICATIONS

Disclosed Anonymously, "Determining message priority and urgency based on upcoming meetings," IP.com Pior Art Database, Apr. 17, 2018, 3 pages, IP.com No. IPCOM000253620D, Retrieved from the Internet: <URL: https://priorart.ip.com/IPCOM/000253620>.

(Continued)

*Primary Examiner* — Sargon N Nano
(74) *Attorney, Agent, or Firm* — Steven M. Bouknight (57) ABSTRACT

A method for automatically consolidating and presenting, on an electronic communication platform, different electronic communications from different electronic communication platforms is provided. The method may include determining whether a user intends to access a received electronic communication. The method may further include based on the determination of the user intention to access the received electronic communication, determining a context associated with the received electronic communication. The method may further include scanning and determining a context associated with unaccessed electronic communications to identify the unaccessed electronic communications related to the determined context associated with the received electronic communication. The method may further include consolidating the identified unaccessed electronic communication with the received electronic communication to generate a consolidated communication. The method may also include presenting, on the electronic communication platform, the consolidated electronic communication.

20 Claims, 6 Drawing Sheets

(56) References Cited

U.S. PATENT DOCUMENTS

| | | | |
|---|---|---|---|
| 7,546,352 | B1 | 6/2009 | Bhattiprolu |
| 7,739,259 | B2 * | 6/2010 | Hartwell ............... G06F 16/332 707/706 |
| 8,484,241 | B2 * | 7/2013 | Bouse .................. H04L 67/306 705/37 |
| 9,116,984 | B2 | 8/2015 | Caldwell |
| 9,154,539 | B2 * | 10/2015 | Balasubramanian ....................... G06F 21/552 |
| 9,294,421 | B2 | 3/2016 | Rasmussen |
| 2004/0064322 | A1 * | 4/2004 | Georgiopoulos ....... G10L 15/26 704/277 |
| 2006/0036692 | A1 * | 2/2006 | Morinigo ................ H04L 51/04 709/206 |
| 2012/0331398 | A1 * | 12/2012 | Madnani ................. H04L 51/16 715/752 |
| 2013/0124548 | A1 | 5/2013 | Chhaparia |
| 2013/0162648 | A1 * | 6/2013 | Abdul-Razzak ....... G06Q 50/01 345/440 |
| 2014/0040182 | A1 * | 2/2014 | Gilder .................. G06F 16/256 707/602 |
| 2014/0164530 | A1 | 6/2014 | Stoertenbecker |
| 2016/0179914 | A1 * | 6/2016 | Radhakrishnan ....... H04L 41/22 707/756 |
| 2017/0099244 | A1 | 4/2017 | Vellal |
| 2018/0287981 | A1 | 10/2018 | Leiba |

OTHER PUBLICATIONS

Disclosed Anonymously, "Method and System for Appending Information to E-mail by Tracking Communication over Multiple Channels," IP.com Prior Art Database, Mar. 12, 2012, 3 pages, IP.com No. IPCOM000215807D, Retrieved from the Internet: <URL: https://priorart.ip.com/IPCOM/000215807>.

Disclosed Anonymously, "Method and System for Detecting Reply of Messages during Active Asynchronous Communication," IP.com Prior Art Database, May 7, 2012, 3 pages, IP.com No. IPCOM000217318D, Retrieved from the Internet: <URL: https://priorart.ip.com/IPCOM/000217318>.

Disclosed Anonymously, "Notify the sender of any pending unprocessed messages from the recipient before completing the connection with the recipient," IP.com Prior Art Database, Sep. 30, 2010, 2 pages, IP.com No. IPCOM000200140D, Retrieved from the Internet: <URL: https://priorart.ip.com/IPCOM/000200140>.

Disclosed Anonymously, "Processing of Pending Messages in Response to Initiating a Communications Session," IP.com Prior Art Database, Mar. 27, 2015, 5 pages, IP.com No. IPCOM000241119D, Retrieved from the Internet: <URL: https://priorart.ip.com/IPCOM/000241119>.

Disclosed Anonymously, "Transfer of Missed Messages Across Instant Messaging Sessions," IP.com Prior Art Database, Aug. 29, 2005, 3 pages, IP.com No. IPCOM000127411D, Retrieved from the Internet: <URL: https://priorart.ip.com/IPCOM/000127411>.

Mell et al., "The NIST Definition of Cloud Computing", Recommendations of the National Institute of Standards and Technology, NIST Special Publication 800-145, Sep. 2011, 7 pages.

* cited by examiner

CONTEXT-BASED CONSOLIDATION OF COMMUNICATIONS ACROSS DIFFERENT COMMUNICATION PLATFORMS

BACKGROUND

The present invention relates generally to the field of computing, and more specifically, to consolidating electronic communications.

Generally, electronic communications may include the creation, storage, exchange, and management of text, images, voice, telex, fax, e-mail, paging, and electronic data interchange (EDI) over a communications network. In programming, electronic messaging is the exchange of messages (such as specially formatted data describing events, requests, and replies) to a messaging server, which acts as a message exchange program for client programs. There are two major electronic messaging server models: the point-to-point model and the publish/subscribe model. Electronic messaging allows programs to share common message-handling code, isolate resources and interdependencies, and easily handle an increase in message volume. Electronic messaging also makes it easier for programs to communicate across different programming environments (operating systems) since the only thing that each environment needs to understand is the common messaging format and protocol. For example, multimedia messaging service (MMS) is a standard way to send electronic messages that include multimedia content to and from a mobile phone over a cellular network. Users and providers may refer to such an electronic message as a PXT, a picture message, or a multimedia message. The MMS standard extends the core SMS (Short Message Service) capability, allowing the exchange of text messages greater than 160 characters in length.

SUMMARY

A method for automatically consolidating and presenting, on an electronic communication platform, different electronic communications from different electronic communication platforms is provided. The method may include in response to receiving an electronic communication on the electronic communication platform, determining whether a user intends to access the received electronic communication. The method may further include based on the determination of the user intention to access the received electronic communication, determining a context associated with the received electronic communication using natural language processing and machine learning. The method may further include in response to determining the context associated with the received electronic communication, scanning and determining a second context associated with unaccessed electronic communications on the electronic communication platform and on the different electronic communication platforms to identify the unaccessed electronic communications related to the determined context associated with the received electronic communication. The method may further include in response to identifying an unaccessed electronic communication related to the determined context associated with the received electronic communication, consolidating the identified unaccessed electronic communication with the received electronic communication to generate a consolidated communication. The method may also include presenting, on the electronic communication platform, the consolidated electronic communication comprising the received electronic communication and the identified unaccessed electronic communication.

A computer system for automatically consolidating and presenting, on an electronic communication platform, different electronic communications from different electronic communication platforms is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include in response to receiving an electronic communication on the electronic communication platform, determining whether a user intends to access the received electronic communication. The method may further include based on the determination of the user intention to access the received electronic communication, determining a context associated with the received electronic communication using natural language processing and machine learning. The method may further include in response to determining the context associated with the received electronic communication, scanning and determining a second context associated with unaccessed electronic communications on the electronic communication platform and on the different electronic communication platforms to identify the unaccessed electronic communications related to the determined context associated with the received electronic communication. The method may further include in response to identifying an unaccessed electronic communication related to the determined context associated with the received electronic communication, consolidating the identified unaccessed electronic communication with the received electronic communication to generate a consolidated communication. The method may also include presenting, on the electronic communication platform, the consolidated electronic communication comprising the received electronic communication and the identified unaccessed electronic communication.

A computer program product for automatically consolidating and presenting, on an electronic communication platform, different electronic communications from different electronic communication platforms is provided. The computer program product may include one or more computer-readable storage devices and program instructions stored on at least one of the one or more tangible storage devices, the program instructions executable by a processor. The computer program product may include program instructions to, in response to receiving an electronic communication on the electronic communication platform, determine whether a user intends to access the received electronic communication. The computer program product may also include program instructions to, based on the determination of the user intention to access the received electronic communication, determine a context associated with the received electronic communication using natural language processing and machine learning. The computer program product may further include program instructions to, in response to determining the context associated with the received electronic communication, scan and determine a second context associated with unaccessed electronic communications on the electronic communication platform and on the different electronic communication platforms to identify the unaccessed electronic communications related to the determined context associated with the received electronic communication. The computer program product may also include program instructions to in response to identifying an unaccessed electronic communication related to the determined context associated with the received electronic communication, consolidate the identified unaccessed electronic communication with the received electronic communication to generate a consolidated communication. The computer program product may include program instructions to present, on the electronic communication platform, the consolidated electronic communication comprising the received electronic communication and the identified unaccessed electronic communication.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to consolidating electronic communications. Specifically, the following described exemplary embodiments provide a system, method and program product for automatically and cognitively consolidating different electronic communications from different communication platforms/modes into one electronic communication based on a determined context and users associated with the different electronic communications. Therefore, the exemplary embodiments have the capacity to improve the technical field associated with electronic communications by using natural language processing (NLP) and machine learning algorithms to identify consolidate different electronic communications from different communication platforms. More specifically, in response to detecting a communication a user intends to receive (read/hear/view), the system, method and program product may use the natural language processing and machine learning techniques to search all unaccessed/unread communications across the different communication platforms that may belong to a determined context associated with the received electronic communication. In turn, and in response to identifying an unaccessed/unread communication that is related to the received electronic communication based on the determined context and/or users associated with the unaccessed/unread communication, the method, computer system, and computer program product may merge/consolidate the unaccessed/unread communication and the received electronic communication into one consolidated communication, and then present the consolidated communication on the communication platform to the user.

As previously described with respect to electronic communications, electronic communications may include the exchange of messages (such as specially formatted data describing events, requests, and replies) to a messaging server, which acts as a message exchange program for client programs. Messaging also allows programs to share common message-handling code. However, while messaging makes it easier for programs to communicate across different programming environments (languages, compilers, and operating systems), in the current era of digital communication, there are several communication platforms/modes, such as email, SMS, WhatsApp® (WhatsApp and all WhatsApp-based trademarks and logos are trademarks or registered trademarks of WhatsApp, LLC and/or its affiliates), Slack® (Slack and all Slack-based trademarks and logos are trademarks or registered trademarks of Slack Technologies, Inc. and/or its affiliates), etc. which a user may be subscribed to and requires a user to switch between for a given topic and/or given recipient. For example, a User A may send an email message to a User B. However, after sending the email message, User A wants User B to fact-check a specific detail based on a topic in the email message. As such, User A may send a separate instant message over a different communication platform, such as Slack®, to User B but before User B has had a chance to read the previously sent email message. Therefore, when viewing/reading the instant message on Slack®, User B may not know the context of the Slack® message since User B did not read the email message. Hence, User B may get confused after reading the Slack® message and then has switch to the email messaging service to read the email message. Thus, the concept of switching between communication platforms/modes is something User B needs to manually interpret, assimilate, and respond accordingly. With the advancement of more communication platforms/modes and expected normalcy of a user multi-tasking by switching between the communication platforms/modes, a user may be bombarded with out-of-context messages based on not reading/viewing a previous communication related to the out-of-context messages, causing loss of productivity.

Therefore, it may be advantageous, among other things, to provide a method, computer system, and computer program product for automatically and cognitively consolidating different electronic communications from different communication platforms/modes into one electronic communication based on a determined context and users associated with the different electronic communications. Specifically, the method, computer system, and computer program product may determine a context of a received electronic communication which a user intends to view/read/hear. Furthermore, the method, computer system, and computer program product may determine different communication platforms associated with the user. Thereafter, the method, computer system, and computer program product may identify a communication or set of communication from the different communication platforms that may be associated with the determined context. Specifically, the method, computer system, and computer program product may search all unaccessed/unread communications that may belong to the determined context across the different communication platforms. In turn, and in response to identifying an unaccessed/unread communication that is related to the received electronic communication based on the determined context and/or users associated with the unaccessed/unread communication, the method, computer system, and computer program product may merge/consolidate the unaccessed/unread communication and the received electronic communication (that the user intends to read) into one consolidated communication, and then present the consolidated communication on the communication platform to the user.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
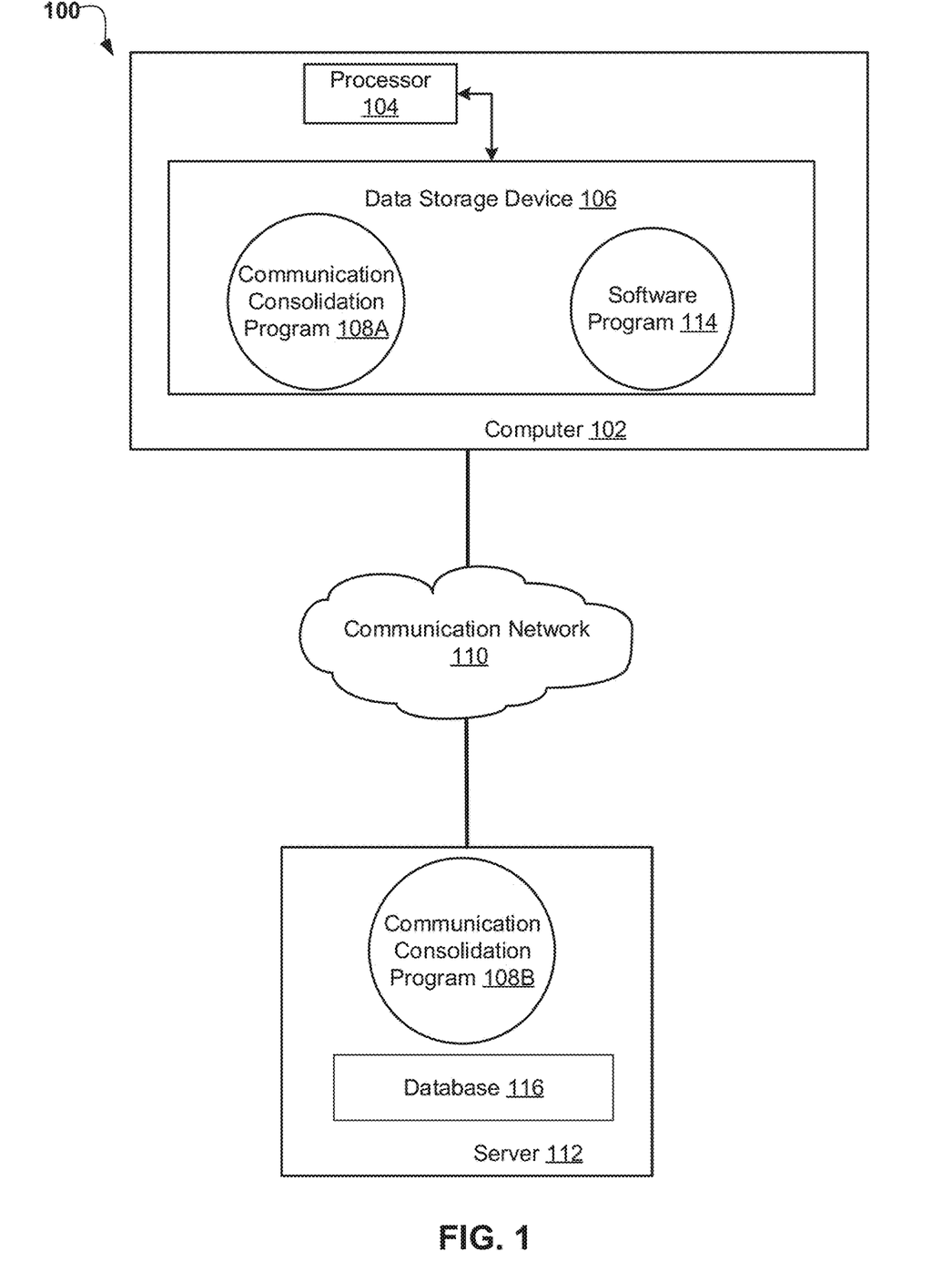
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a communication consolidation program 108A and a software program 114, and may also include a microphone (not shown). The software program 114 may include one or multiple application programs such as an electronic communication program, internet program, and/or one or more mobile apps running on a computer 102, such as a mobile phone device. For example, the electronic communication program/app may include an e-mail, text, image, voice, telex, and fax program/app and/or other electronic communication programs/apps. The communication consolidation program 108A may communicate with the software program 114. The networked computer environment 100 may also include a server 112 that is enabled to run a communication consolidation program 108B and the communication network 110.

The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server computer 112 via the communications network 110. The communications network 110 may include connections, such as wire, wireless communication links, or fiber optic cables. As will be discussed with reference to FIG. 4, server computer 112 may include internal components 710a and external components 750a, respectively, and client computer 102 may include internal components 710b and external components 750b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, and internet of things (IoT) device, an augmented reality (AR) device, or any type of computing device capable of running a program and accessing a network. According to various implementations of the present embodiment, the communication consolidation program 108A, 108B may interact with a database 116 that may be embedded in various storage devices, such as, but not limited to, a mobile device 102, a networked server 112, or a cloud storage service.

According to the present embodiment, a program, such as a communication consolidation program 108A and 108B may run on the computer 102 and/or on the server computer 112 via a communications network 110. The communication consolidation program 108A, 108B may automatically and cognitively consolidate different electronic communications from different communication platforms/modes into one electronic communication based on a determined context and users associated with the different electronic communications. Specifically, the computer 102, such as a desktop computer, laptop computer, tablet, and/or mobile device, may run a communication consolidation program 108A, 108B, that may interact with a software program 114 to search for unaccessed/unread communications across the different communication platforms that may belong to a determined context associated with a received electronic communication, whereby the unaccessed electronic communications may include communication that have not been accessed (i.e. not viewed, read, or listened to) by the user. In turn, and in response to identifying an unaccessed/unread communication that is related to the received electronic communication (based on the determined context and/or users associated with the unaccessed/unread communication), the communication consolidation program 108A, 108B may merge/consolidate the unaccessed/unread communication and the received electronic communication into one consolidated communication, and then present the consolidated communication on the communication platform to the user.

Figure 2:
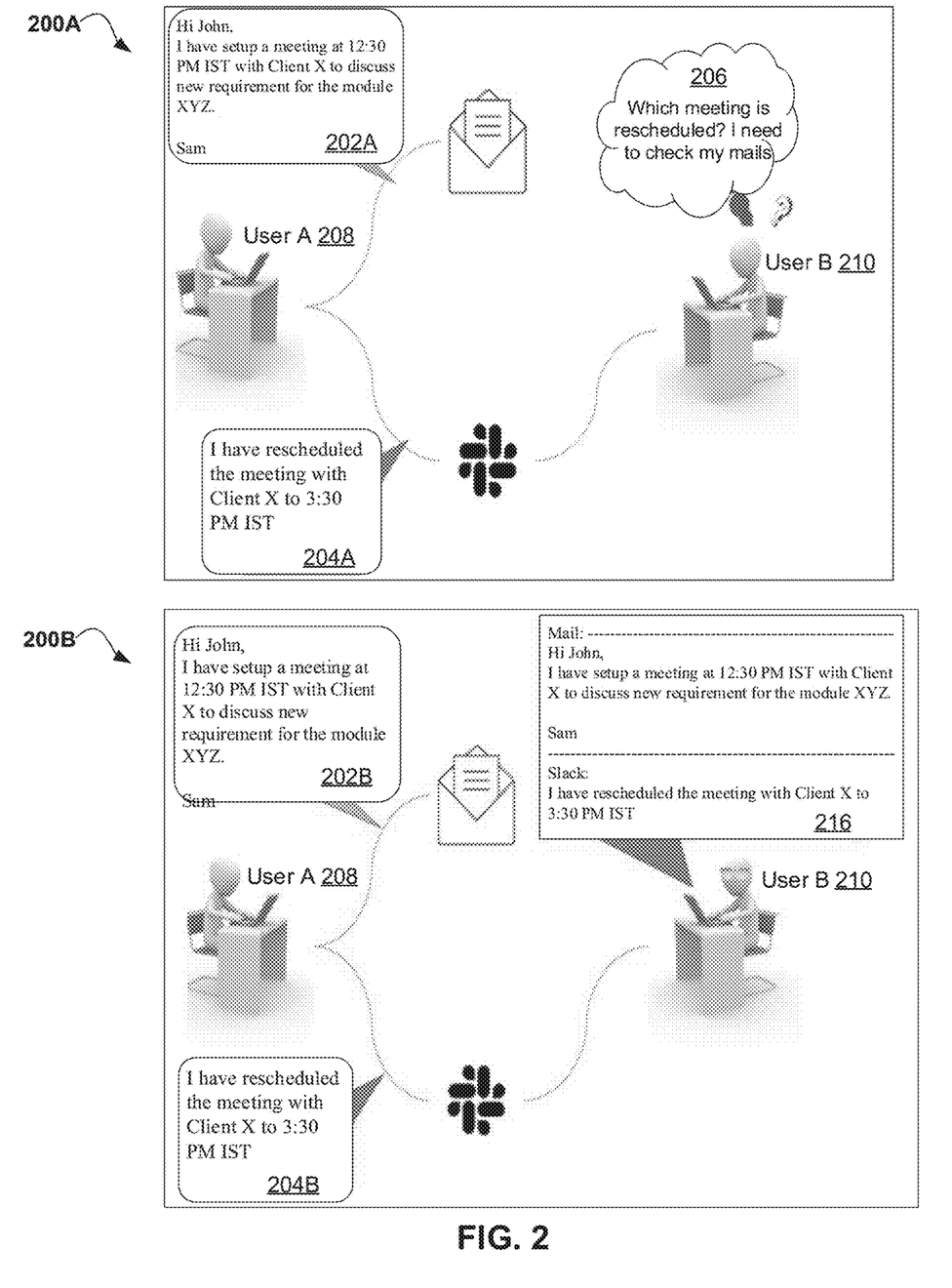
FIG. 2 are example diagrams illustrating an embodiment of a program for automatically consolidating and presenting, on an electronic communication platform, different electronic communications from different electronic communication platforms according to one embodiment.

Referring now to FIG. 2, example diagrams illustrating an embodiment of the communication consolidation program 108A, 108B is depicted. Specifically, in FIG. 2, an exemplary diagram 200A describes a scenario without implementation of the communication consolidation program 108A, 108B, while exemplary diagram 200B describes a similar scenario but with implementation of the communication consolidation program 108A, 108B.

For example, and referring to exemplary diagram 200A, in a typical scenario a User A 208 may send an email message 202A to a User B 210. Specifically, the User A 208A may access a software program 114 (FIG. 1) on a computer 102 (FIG. 1), whereby the software program 114 may be an email communication platform to send the email message 202A to the User B 210A. As further described in FIG. 2, the email message 202A may include content referring to a meeting with a Client X for discussing a module XYZ. However, after sending the email message 202A via the email communication platform, the User A 208A may have rescheduled the meeting with Client X. In turn, the User A 208A may inform the User B 210A of a rescheduling of the meeting via a different communication platform that is separate from the email communication platform that was used to send the email message 202A. More specifically, for example, the User A 208A may send an instant message 204A over an instant messaging communication platform (such as Slack®) to the User B 210A, whereby the instant message 204A includes content informing the User B 210A that the meeting has been rescheduled. The User B 210A may receive the instant message via the instant messaging communication platform located on a different computer 102 that is specifically associated with the User B 210A. However, the User B 210A may receive/view the instant message 204A about rescheduling the meeting before the User B 210A has had a chance to access/view the email message 202A that first mentions the meeting. Therefore, the User B 210A may not know a context of the instant message 204A, such as not knowing the meeting that User A 208 is referring to since the User B 210A did not view the email message 202A. As such, and as indicated at 206, without implementation of the communication consolidation program 108A, 108B, the User B 210A may be confused after viewing/reading the instant message 204A. In turn, the User B 210A may be forced to respond to the User A 208A with another instant message asking the User A 208A which meeting the User A 208A is referring to, and/or may switch to and access the email communication platform to specifically look for and determine which meeting the User A 208 is referencing.

However, and referring to exemplary diagram 200B in FIG. 2, the communication consolidation program 108A, 108B may automatically and cognitively consolidate different electronic communications from different electronic communication platforms to generate a consolidated communication, and then present the consolidated communication on an electronic communication platform. Specifically, similar to the scenario described above, the communication consolidation program 108A, 108B may detect a received electronic communication, such as the instant message 204B, on an instant messaging communication platform associated with the User B 210B. The instant message 204B may similarly include content informing the User B 210B that a meeting with Client X has been rescheduled. However, and as will be further described in FIG. 3, in response to determining that the User B 210B intends to read the instant message 204B, the communication consolidation program 108A, 108B may automatically determine the context of the instant message 204B (such as by determining that the instant message 204B comes from a certain user and refers to a meeting). Then, in response to determining the context of the instant message 204B, the communication consolidation program 108A, 108B may automatically scan unaccessed/unread messages from other communication platforms (as well as from the instant messaging communication platform) to identify messages that may be related to the instant message 204B based on the determined context.

Based on the scan, the communication consolidation program 108A, 108B may determine that an unaccessed/unread email message 202B from an email communication platform associated with the User B 210B is related to and may precede the instant message 204B (according to other embodiments, the email message may have been sent after the instant message and the communication consolidation program 108A, 108B may still consolidate accordingly). As such, the communication consolidation program 108A, 108B may automatically consolidate (i.e. merge or combine) the email message 202B and the instant message 204B into one consolidated communication 216 and present the consolidated communication 216 on the instant messaging communication platform in response to the user accessing the instant message 204B. Specifically, and as previously described, the communication consolidation program 108A, 108B may have determined that the User B 210B intends to access/read the instant message 204B. Thereafter, based on the processes described above, in response to the User B 210B accessing (i.e. selecting or clicking on) the instant message 204B, the communication consolidation program 108A, 108B may present the consolidated communication 216 which includes the email message 202B and the instant message 204B, on the electronic communication platform for which the User B 210B is currently active (which, in the example, is the instant messaging communication platform). Therefore, the communication consolidation program 108A, 108B may extract and import the contents and other data (sender, recipients, timestamp data) associated with the email message 202B into the instant messaging communication platform in response to the user accessing the instant message 204B.

Figure 3:
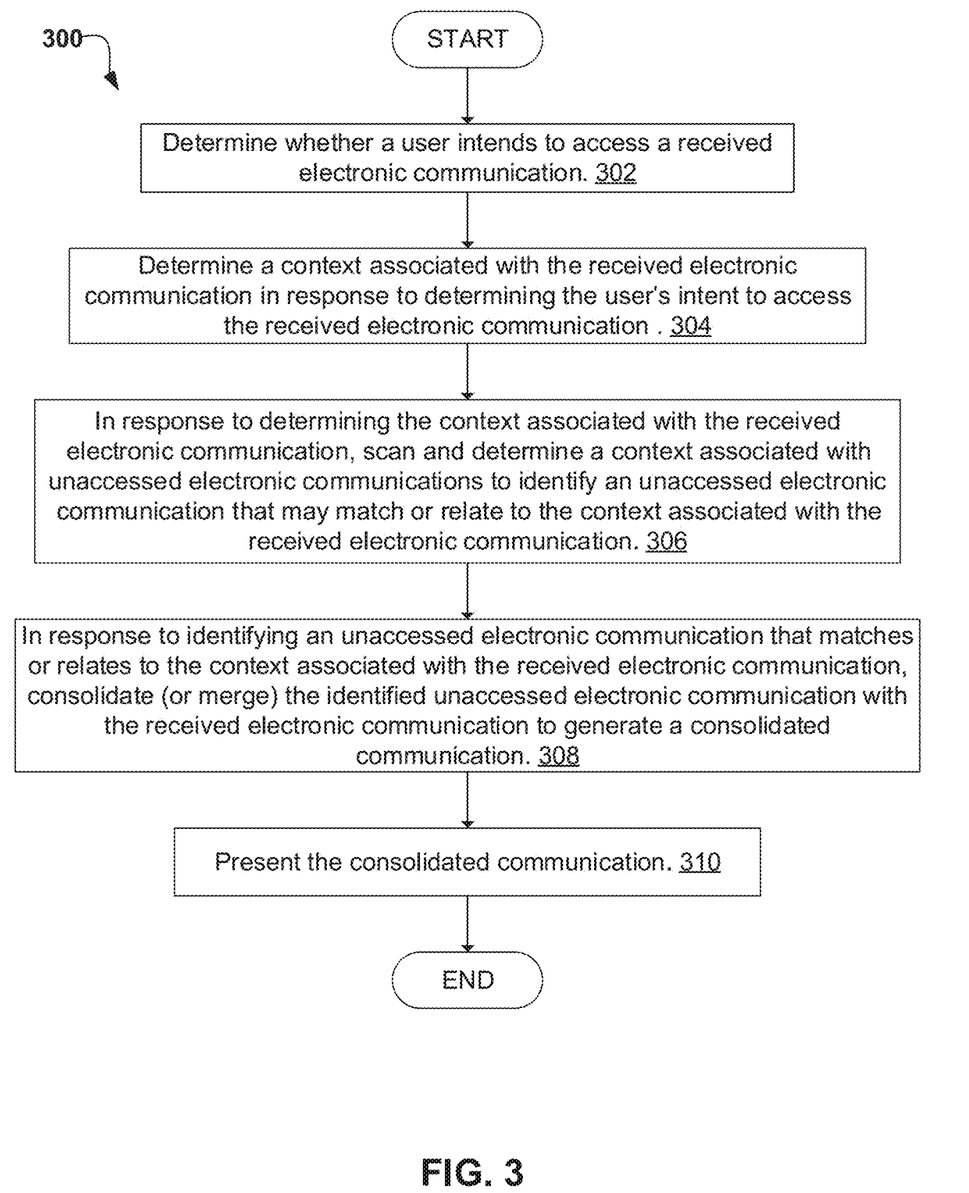
FIG. 3 is an operational flowchart illustrating the steps carried out by a program for automatically consolidating and presenting, on an electronic communication platform, different electronic communications from different electronic communication platforms according to one embodiment.

Referring now to FIG. 3, an operational flowchart 300 illustrating the steps carried out by the communication consolidation program 108A, 108B for automatically and cognitively consolidating different communications from different communication platforms and then presenting the consolidated communications on a communication platform according to one embodiment is depicted. Specifically, at 302, the communication consolidation program 108A, 108B may determine whether a user intends to access (i.e. view, read, and/or listen to) a received electronic communication. According to one embodiment, the received electronic communication may include an electronic message such as an email message, an instant/chat message, a social media message, and a voice message, whereby the electronic messages may include text, images, and/or video. The received electronic communication may also include other types of communications such as video blogs and video conferencing (for example, from use of web cameras), whereby speech recognition algorithms/techniques may be used to identify language in the video blog and video conferencing. The communication consolidation program 108A, 108B may detect that a user receives the communication on a specific communication platform. As previously described, the communication consolidation program 108A, 108B may determine whether the user intends to access the received electronic communication, for example, by using key detection and/or keylogging. More specifically, the communication consolidation program 108A, 108B may determine whether a user intends to access a received electronic communication based on a type of the received electronic communication, and/or based on a type of communication platform associated with the received electronic communication, as well as based on an action performed on the received electronic communication.

For example, an email communication platform may typically include a list of email messages with sender, subject, and timestamp columns. Accordingly, the communication consolidation program 108A, 108B may determine that a user who is a recipient of a particular email message (an email message that is received but unread/unviewed) intends to access (i.e. read/view) the particular email message based on the recipient user selecting or clicking on one of the columns associated with the particular email message among the list email messages. Alternatively, an instant messaging communication platform may typically include a list of usernames corresponding to contacts on the instant messaging communication platform, whereby a received message that may be unread/unviewed may be indicated by a highlighted username. Accordingly, the communication consolidation program 108A, 108B may determine that a recipient user intends to read an instant message (one that is received but unread/unviewed) based on the recipient user selecting or scrolling over a username associated with a sender of the instant message on the instant messaging communication platform. As an example, and referring to exemplary diagram 200B in FIG. 2, the User B 210B may be the recipient of the instant message 204B from the sender User A 208B. The communication consolidation program 108A, 108B may determine that the User B 210B intends to read the instant message 204B based on the User B 210 clicking on or scrolling over a username associated with the User A 208B. According to another embodiment, the communication consolidation program 108A, 108B may determine whether a user intends to access a received electronic communication based on other actions performed on an electronic communication platform such as a user searching for a sender's name that corresponds to a sender of the received electronic communication, and/or searching for keywords associated with keywords that relate to content in the received electronic communication.

Thereafter, according to one embodiment, and as depicted at 304 in FIG. 3, the communication consolidation program 108A, 108B may determine a context associated with the received electronic communication in response to determining the user's intent to access the received electronic communication. According to another embodiment, the communication consolidation program 108A, 108B may also automatically determine the context associated with received electronic communications as the communications are received. For example, referring to the previously described step 302, in response to detecting the received electronic communication, the communication consolidation program 108A, 108B may automatically determine the context associated with the received electronic communication. Also, for each detection of a received electronic communication across each of the different communication platforms associated with the user, the communication consolidation program 108A, 108B may automatically determine the context of each of the received electronic communications.

In either embodiment, the communication consolidation program 108A, 108B may use natural language processing (NLP) and machine learning algorithms to determine the context of the received electronic communication. Specifically, using NLP and/or machine learning algorithms, the communication consolidation program 108A, 108B may determine the context of the received electronic communication by specifically identifying content within the received electronic communication including text/language, images, video, and voice (for video and voice may use speech recognition, speech-to-text, and voice recognition algorithms/techniques). More specifically, the communication consolidation program 108A, 108B may use NLP techniques such as text summarization, named entity recognition, topic modeling, aspect mining, and sentiment analysis to parse text and other parts of a communication to classify/identify the different parts. The communication consolidation program 108A, 108B may also use image recognition, video recognition, and speech recognition tools. The communication consolidation program 108A, 108B may also determine the context by identifying other information associated with the received electronic communication such as the sender of the received electronic communication, other recipients of the received electronic communication (such as for group messages, determining other users/members in the group message), timestamp data, metadata, etc. For example, and referring to exemplary diagram 200B in FIG. 2, in response to determining that the User B 210B intends to read the instant message 204B, the communication consolidation program 108A, 108B may use NLP and machine learning algorithms to automatically determine the context of the instant message 204B such as by determining that the instant message 204B comes from a certain user, specifically User A 208B, and that the content within the instant message 204B specifically refers to a meeting with a Client X at a specific time. The communication consolidation program 108A, 108B may also identify the timestamp data associated with the instant message 204B to determine when the instant message 204B was sent by the User A 208B and when the instant message 204B was received on the instant message communication platform associated with User B 210B.

Next, at 306, in response to determining the context associated with the received electronic communication, the communication consolidation program 108A, 108B may scan and determine a context associated with unaccessed electronic communications to identify an unaccessed electronic communication that may match or relate to the context associated with the received electronic communication. Specifically, the communication consolidation program 108A, 108B may automatically scan and determine a context associated with unaccessed electronic communications on the communication platform that is in receipt of the received electronic communication, as well as scan and identify unaccessed electronic communications on another, different communication platform, to specifically identify an unaccessed electronic communication that matches or relates to the context associated with the received electronic communication. According to one embodiment, the communication consolidation program 108A, 108B may be implemented with each of the different communication platforms to gain access to content on each of the different communication platforms. According to another embodiment, based on content sensitivity and security preferences/ protocols associated with a given computer 102 and/or a given communication platform, the communication consolidation program 108A, 108B may prompt a user to allow/grant the communication consolidation program 108A, 108B permission to gain access to content on the given communication platform.

In either embodiment, the communication consolidation program 108A, 108B may again use the NLP and machine learning algorithms to scan and identify the unaccessed electronic communications on the different communication platforms (including the communication platform in receipt of the received electronic communication) that may match the context of the received electronic communication. As previously described, an unaccessed electronic communication may include communications on a given communication platform that user has not selected and/or clicked on and thereby has not viewed, listened to, and/or read. According to one embodiment, the communication consolidation program 108A, 108B may determine that the context of an unaccessed electronic communication may match (or relate to) the context of the received electronic communication based on a determination that content within the unaccessed electronic communication matches or relates to content within the received electronic communication, and/or based on a determination that other information (such as metadata, timestamp data, and users/sender/recipients associated with the unaccessed electronic communication) matches or corresponds to the information associated with the received electronic communication.

Specifically, for example, and referring to the previously described exemplary diagram 200B in FIG. 2, the communication consolidation program 108A, 108B may use NLP and machine learning algorithms to automatically determine the context of the instant message 204B such as by determining that the instant message 204B comes from a certain user, specifically User A 208B, and that the content within the instant message 204B specifically refers to a meeting with a Client X at a specific time. The communication consolidation program 108A, 108B may also identify timestamp data associated with the instant message 204B to determine when the instant message 204B was sent by the User A 208B as well as when the instant message 204B was received on the instant message communication platform associated with User B 210B. In turn, the communication consolidation program 108A, 108B may automatically scan and determine the context associated with unaccessed messages from other communication platforms (as well as from the instant messaging communication platform) to identify an unaccessed electronic communication, such as email message 202B, that may be related to the instant message 204B based on the context. For example, the communication consolidation program 108A, 108B may use the previously described NLP techniques as well as known machine learning techniques/algorithms such as regression, classification, clustering, decision trees, and neural networks, to compare the context of the instant message 204B (the received electronic communication) to the determined context of unaccessed electronic communications. For example, the communication consolidation program 108A, 108B may compare text, language, images, video, sender information, recipient information, metadata, timestamp data, and other data between the received electronic communication and the unaccessed electronic communications. In turn, based on the scan using the NLP and machine learning algorithms, the communication consolidation program 108A, 108B may determine that the email message 202B is an unaccessed/unread communication, that the email message 202B may similarly refer to a meeting with a Client X, that the email message 202B is also from the User A 208B, and (based on timestamp data) that the email message 202B was received on the email communication platform before the instant message 204B was received on the instant messaging communication platform. Therefore, based on the determined similarities, the communication consolidation program 108A, 108B may determine that the email message 202B from the email communication platform matches and/or is related to the instant message 204B on the instant messaging communication platform.

Next, at 308, in response to identifying an unaccessed electronic communication that matches or relates to the context associated with the received electronic communication, the communication consolidation program 108A, 108B may consolidate (or merge) the identified unaccessed electronic communication with the received electronic communication to generate a consolidated communication, and then at 310 present/display (on a computer 102) the consolidated communication in a window associated with the received electronic communication on the communication platform. According to one embodiment, consolidating the unaccessed electronic communication and the received electronic communication may include extracting and importing content/data associated with the identified unaccessed electronic communication (and/or the contents/data thereof) into the communication platform associated with the received electronic communication, and presenting both the extracted and imported content associated with the identified unaccessed electronic communication and with the content of the received electronic communication in response to the user accessing the received electronic communication.

Specifically, for example, and as previously described with respect to exemplary diagram 200B in FIG. 2, in response to determining that a User B 210B intends to read an instant message 204B, the communication consolidation program 108A, 108B may automatically determine the context of the instant message 204B as described at step 304 above. Then, as described at step 306, the communication consolidation program 108A, 108B may automatically scan unaccessed electronic communications from other communication platforms (as well as from the instant messaging communication platform) to identify unaccessed electronic communications that may be related to the instant message 204B based on the context. Based on the scan, the communication consolidation program 108A, 108B may determine that an unaccessed/unread email message 202B from an email communication platform associated with the User B 210B is related to and precedes the instant message 204B. As such, and as depicted in exemplary diagram 200B (FIG. 2), the communication consolidation program 108A, 108B may automatically consolidate (i.e. merge or combine) the email message 202B and the instant message 204B into one consolidated communication 216 and present the consolidated communication 216 on the instant messaging communication platform in response to the user accessing the instant message 204B. Specifically, in response to the User B 210B actually accessing (i.e. selecting or clicking on) the instant message 204B, the communication consolidation program 108A, 108B may extract the content and other data (including the message, sender, recipients, timestamp data) associated with the email message 202B and may present the email message 202B with the instant message 204B in a consolidated message 216 on the communication platform for which the User B 210B is currently active (which, in the example, is the instant messaging communication platform). Therefore, the communication consolidation program 108A, 108B may extract and import the contents and other data (sender, recipients, timestamp data) associated with the email message 202B into the instant messaging communication platform in response to the user accessing the instant message 204B and present the extracted and imported content with the instant message 204B in a window that is specifically associated with the instant message 204B on the communication platform. The consolidated communication may also be presented in other ways depending on the computer 102 and/or communication platform. For example, for an augmented reality (AR) device, such as AR glasses, the communication consolidation program 108A, 108B may simply present the consolidated communication in a view on the AR glasses.

As such, according to one embodiment, when presenting the consolidated communication, the communication consolidation program 108A, 108B may use content formatting preferences of the communication platform associated with the received electronic communication (i.e. the content formatting preferences of the communication platform that the unaccessed electronic communication is imported into). For example, the communication consolidation program 108A, 108B may extract the content and other data (including the message, sender, recipients, timestamp data) associated with the email message 202B and may present the email message 202B in a consolidated communication with the instant message 204B on the instant messaging communication platform as plain text or rich text depending on the content formatting preferences of the instant messaging communication platform. Also, according to another embodiment, in response to further identifying the imported unaccessed electronic communication includes video content and/or audio content, the communication consolidation program 108A, 108B may present in the consolidated communication the video content and/or audio content (such as by importing a file associated with the video content and/or audio content), and/or provide a link to the video content and/or audio content.

Another example may include group messaging. Specifically, for example, a first communication may include a meeting invitation generated by a User X on an email communication platform, whereby the meeting invitees include User Y and User Z, each of whom were sent the meeting invitation. However, a User W may have been mistakenly omitted from the meeting invitation on the email communication platform but may still be informed of the meeting from User X through other communicative means. User W may, in turn, send an instant message via an instant messaging communication platform to a group that includes User W, User X, User Y, and User Z, whereby the instant message includes an attached document and text stating: "Hey User Y, please have this summary handy for our discussion regarding module ABC." However, the communication consolidation program 108A, 108B may detect that User Y has not accessed the meeting invitation that may be sitting in User Y's email communication platform. But, in response to detecting an intention by User Y to access the instant message, such as by clicking on a group name associated with the instant message on the instant messaging communication platform, the communication consolidation program 108A, 108B (using the steps provided in FIG. 3) may extract and consolidate content associated with the meeting invitation with the instant message to generate a consolidated communication, whereby only User Y may be able to view the consolidated communication from User Y's access to the instant messaging communication platform whereas Users X, Y, and W may simply see the instant message by itself.

Also, according to one embodiment, the communication consolidation program 108A, 108B may receive and use feedback (and/or be updated with feedback) to determine to consolidate certain communications based on a threshold value, machine learning, and/or configurable preferences (such as user preference). For example, referring to step 306 in FIG. 3, based on a scan of unaccessed electronic communications on the different communication platforms, the communication consolidation program 108A, 108B may lack confidence on whether a certain unaccessed electronic communication matches or is related to the context of a received electronic communication. In such cases, the communication consolidation program 108A, 108B may use the machine learning algorithms to generate a confidence score or threshold percentage to further identify whether a certain unaccessed electronic communication matches the context of a received electronic communication. For example, a confidence score represented by a threshold percentage, such as greater than 70%, may be set for unaccessed electronic communications that the communication consolidation program 108A, 108B may be confident about and, thus, does not require additional review. Conversely, a confidence score represented by a threshold percentage, such as less than 70%, may be set for unanswered communications that the communication consolidation program 108A, 108B may not be confident about and, thus, does require additional review by a user.

For example, in response to determining that the user has accessed a received electronic communication (and after having performed the aforementioned steps in FIG. 3 for determining whether unaccessed electronic communications may be related to the received electronic communication), the communication consolidation program 108A, 108B may present a preview of suggested unaccessed electronic communications for which the communication consolidation program 108A, 108B may lack confidence that the unaccessed electronic communications are related to the received electronic communication, such as by presenting a pop-up window. Furthermore, in the presented preview, the communication consolidation program 108A, 108B may prompt the user to provide user feedback on each of the suggested unaccessed electronic communications, such as by prompting the user to click on a Yes button or No button in response to the question "is this unaccessed electronic communication related." The communication consolidation program 108A, 108B may, in turn, use the user feedback as learning feedback for the machine learning algorithms associated with the communication consolidation program 108A, 108B to make future determinations on whether an unaccessed electronic communication matches or is related to a received electronic communication.

Furthermore, and as mentioned above, the communication consolidation program 108A, 108B may determine to consolidate certain electronic communications based on configurable preferences (such as user preferences). Specifically, a user may wish to consolidate all communications specifically associated with a certain user, a certain topic, and/or a certain communication platform. As such, the communication consolidation program 108A, 108B may include a user interface that includes options for choosing types of communications that the communication consolidation program 108A, 108B may consolidate, whereby the types of communication may be based on a type of user or a specific user associated with a communication, a type of topic associated with a communication, and/or a type of communication platform associated with the communication. For example, based on user preferences, the communication consolidation program 108A, 108B may consolidate all communications coming from a User X. In another example, based on user preferences, the communication consolidation program 108A, 108B may consolidate all communications concerning a Project Y. In yet another example, based on user preferences, the communication consolidation program 108A, 108B may consolidate only communications associated with communication platform A and communication platform B.

It may be appreciated that FIGS. 1-3 provide only illustrations of one implementation and does not imply any limitations with regard to how different embodiments may be implemented. Many modifications to the depicted environments may be made based on design and implementation requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
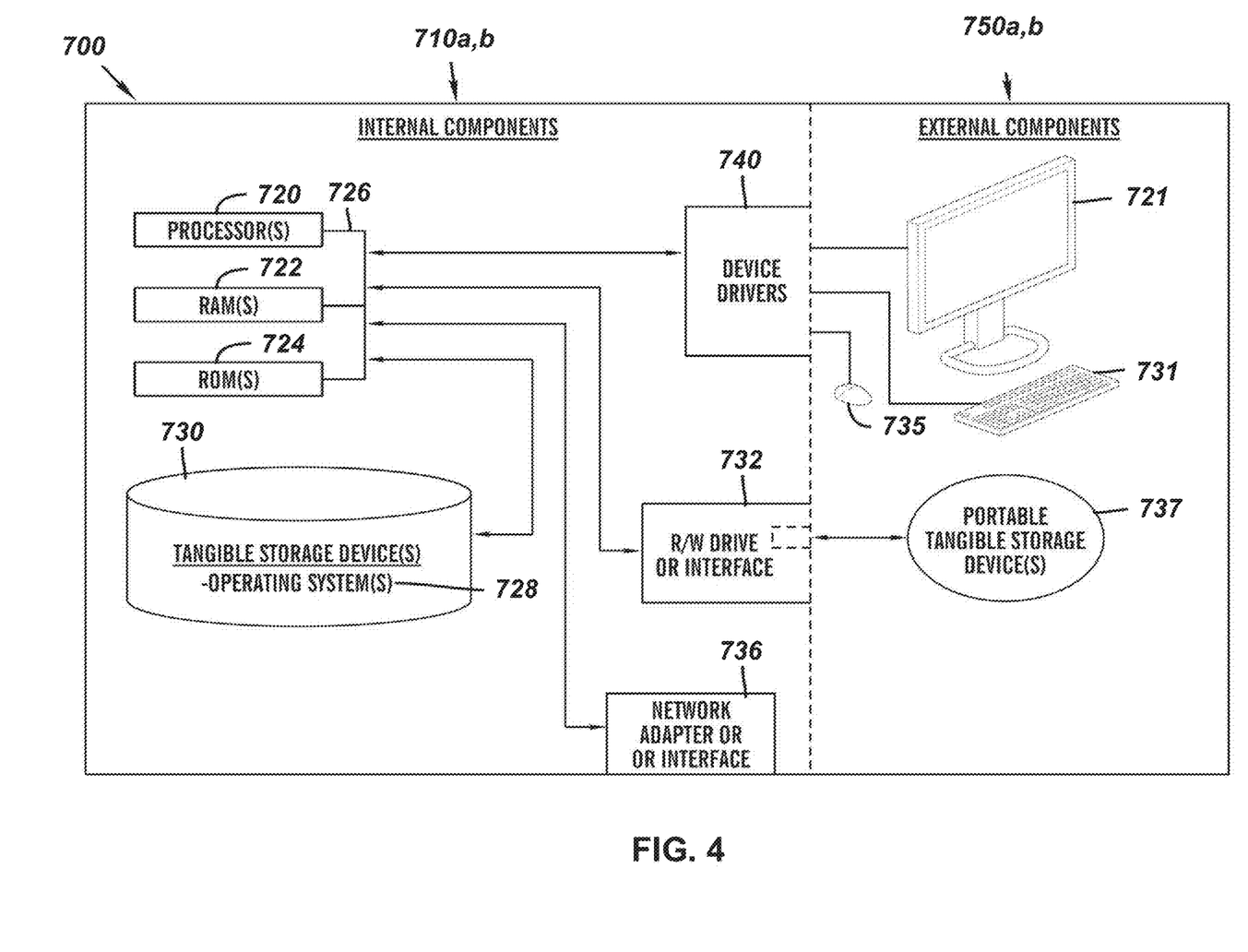
FIG. 4 is a block diagram of the system architecture of the program for automatically consolidating and presenting, on an electronic communication platform, different electronic communications from different electronic communication platforms according to one embodiment.
Figure 6:
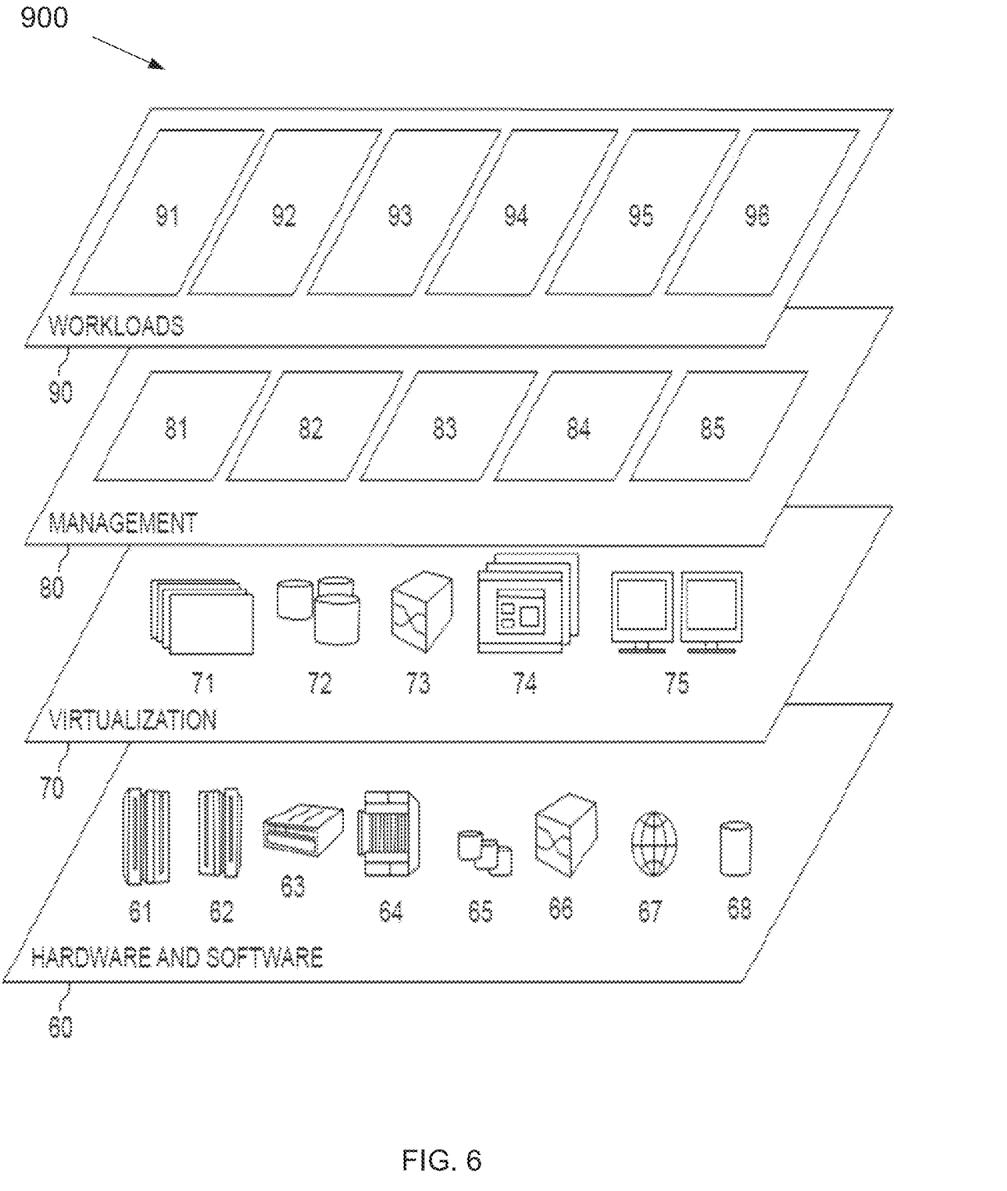
FIG. 6 is a block diagram of functional layers of the illustrative cloud computing environment of FIG. 5, in accordance with an embodiment of the present disclosure.

FIG. 4 is a block diagram 700 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 710a, b and 750a, b is representative of any electronic device capable of executing machine-readable program instructions that may include a computer 102 (710a and 750a) and/or a server 112 (710b and 750b). Data processing system 710a, b and 750a, b may be representative of a smart phone, a computer system, PDA, or other electronic devices. Examples of computing systems, environments, and/or configurations that may represented by data processing system 710a, b and 750a, b may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710a, b and external components 750a, b illustrated in FIG. 6. Each of the sets of internal components 710a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the Communication consolidation program 108A (FIG. 1) in client computer 102 (FIG. 1), and the Communication consolidation program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 6, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710a, b, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as a communication consolidation program 108A and 108B (FIG. 1), can be stored on one or more of the respective portable computer-readable tangible storage devices 737, read via the respective RAY drive or interface 732, and loaded into the respective hard drive 730.

Each set of internal components 710a, b also includes network adapters or interfaces 736 such as a TCP/IP adapter cards, wireless Wi-Fi interface cards, or 3G or 4G wireless interface cards or other wired or wireless communication links. The Communication consolidation program 108A (FIG. 1) and software program 114 (FIG. 1) in client computer 102 (FIG. 1), and the Communication consolidation program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the Communication consolidation program 108A (FIG. 1) and software program 114 (FIG. 1) in client computer 102 (FIG. 1) and the Communication consolidation program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750a, b can include a computer display monitor 721, a keyboard 731, and a computer mouse 735. External components 750a, b can also include touch screens, virtual keyboards, touch pads, pointing devices, and other human interface devices. Each of the sets of internal components 710a, b also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
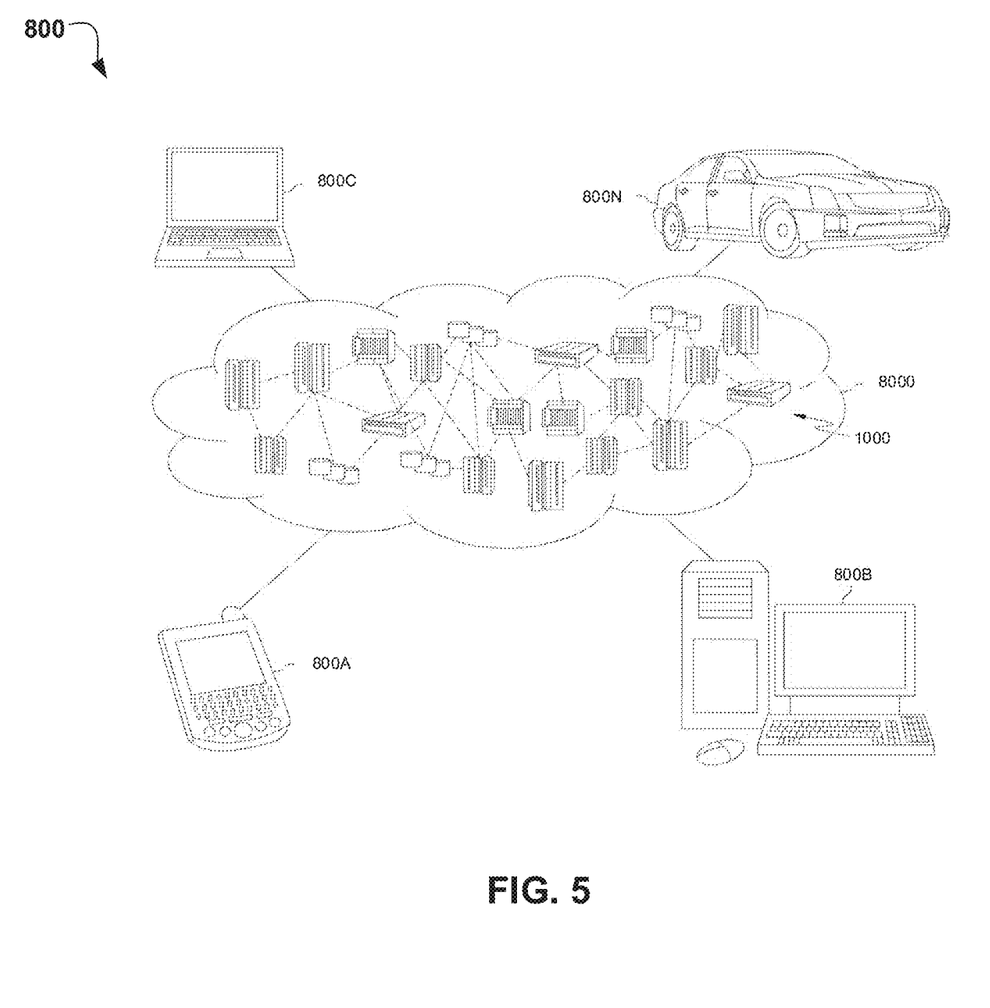
FIG. 5 is a block diagram of an illustrative cloud computing environment including the computer system depicted in FIG. 1, in accordance with an embodiment of the present disclosure.

Referring now to FIG. 5, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud 8000 to offer infrastructure, platforms and/or software as services for which a cloud consumer does not need to maintain resources on a local computing device. It is understood that the types of computing devices 800A-N shown in FIG. 7 are intended to be illustrative only and that computing nodes 100 and cloud 8000 can communicate with any type of computerized device over any type of network and/or network addressable connection (e.g., using a web browser).

Referring now to FIG. 6, a set of functional abstraction layers 900 provided by cloud computing environment 800 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Communication consolidation 96. A communication consolidation program 108A, 108B (FIG. 1) may be offered "as a service in the cloud" (i.e., Software as a Service (SaaS)) for applications running on computing devices 102 (FIG. 1) and may automatically consolidate and present, on an electronic communication platform, different electronic communications from different electronic communication platforms.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically consolidating and presenting, on an electronic communication platform, different electronic communications from different electronic communication platforms, comprising:
   in response to receiving an electronic communication on the electronic communication platform, determining whether a user intends to access the received electronic communication, wherein determining that the user intends to access the received electronic communication comprises detecting at least one of: the user scrolling over the received electronic communication and the user selecting the received electronic communication;
   based on the determination of the user intention to access the received electronic communication, determining a context associated with the received electronic communication using natural language processing and machine learning;
   in response to determining the context associated with the received electronic communication, scanning and determining a second context associated with unaccessed electronic communications on the electronic communication platform and on the different electronic communication platforms to identify the unaccessed electronic communications related to the determined context associated with the received electronic communication;
   in response to identifying an unaccessed electronic communication related to the determined context associated with the received electronic communication, consolidating the identified unaccessed electronic communication with the received electronic communication to generate a consolidated communication; and
   presenting, on the electronic communication platform, the consolidated electronic communication comprising the received electronic communication and the identified unaccessed electronic communication.

2. The computer-implemented method of claim 1, wherein determining the context of the received electronic communication further comprises:
   identifying and classifying different parts of the received electronic communication;
   wherein the different parts of the received electronic communication are selected from a group comprising text, images, video, sender information, recipient information, metadata, and timestamp data.

3. The computer-implemented method of claim 2, further comprising:
   comparing the determined context associated with the received electronic communication to the second context of each of the unaccessed electronic communications to determine whether the unaccessed communications relate to the received electronic communication.

4. The method of claim 1, wherein the identified unaccessed electronic communication is from one of the different electronic communication platforms.

5. The computer-implemented method of claim 1, wherein consolidating the identified unaccessed electronic communication with the received electronic communication further comprises:
   extracting and importing content associated with the identified unaccessed electronic communication into the electronic communication platform associated with the received electronic communication.

6. The computer-implemented method of claim 5, wherein presenting the consolidated electronic communication further comprises:
   presenting the extracted and imported content associated with the identified unaccessed electronic communication with the received electronic communication in response to the user accessing the received electronic communication and in a window specifically associated with the received electronic communication on the electronic communication platform.

7. The computer-implemented method of claim 1, further comprising:
   receiving and using feedback to make a determination on whether to consolidate electronic communications, wherein the feedback is based on machine learning and configurable preferences.

8. A computer system for automatically consolidating and presenting, on an electronic communication platform, different electronic communications from different electronic communication platforms, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   in response to receiving an electronic communication on the electronic communication platform, determining whether a user intends to access the received electronic communication, wherein determining that the user intends to access the received electronic communication comprises detecting at least one of: the user scrolling over the received electronic communication and the user selecting the received electronic communication;
   based on the determination of the user intention to access the received electronic communication, determining a context associated with the received electronic communication using natural language processing and machine learning;
   in response to determining the context associated with the received electronic communication, scanning and determining a second context associated with unaccessed electronic communications on the electronic communication platform and on the different electronic communication platforms to identify the unaccessed electronic communications related to the determined context associated with the received electronic communication;
   in response to identifying an unaccessed electronic communication related to the determined context associated with the received electronic communication, consolidating the identified unaccessed electronic communication with the received electronic communication to generate a consolidated communication; and
   presenting, on the electronic communication platform, the consolidated electronic communication comprising the received electronic communication and the identified unaccessed electronic communication.

9. The computer system of claim 8, wherein determining the context further comprises:
- identifying and classifying different parts of the received electronic communication; and
- wherein the different parts of the received electronic communication are selected from a group comprising text, images, video, sender information, recipient information, metadata, and timestamp data.

10. The computer system of claim 9, further comprising:
- comparing the determined context associated with the received electronic communication to the second context of each of the unaccessed electronic communications to determine whether the unaccessed communications relate to the received electronic communication.

11. The computer system of claim 8, wherein the identified unaccessed electronic communication is from one of the different electronic communication platforms.

12. The computer system of claim 8, wherein consolidating the identified unaccessed electronic communication with the received electronic communication further comprises:
- extracting and importing content associated with the identified unaccessed electronic communication into the electronic communication platform associated with the received electronic communication.

13. The computer system of claim 12, wherein presenting the consolidated electronic communication further comprises:
- presenting the extracted and imported content associated with the identified unaccessed electronic communication with the received electronic communication in response to the user accessing the received electronic communication and in a window specifically associated with the received electronic communication on the electronic communication platform.

14. The computer system of claim 8, further comprising:
- receiving and using feedback to make a determination on whether to consolidate electronic communications, wherein the feedback is based on machine learning and configurable preferences.

15. A computer program product for automatically consolidating and presenting, on an electronic communication platform, different electronic communications from different electronic communication platforms, comprising:
- one or more tangible computer-readable storage devices and program instructions stored on at least one of the one or more tangible computer-readable storage devices, the program instructions executable by a processor, the program instructions comprising:
- in response to receiving an electronic communication on the electronic communication platform, determining whether a user intends to access the received electronic communication, wherein determining that the user intends to access the received electronic communication comprises detecting at least one of: the user scrolling over the received electronic communication and the user selecting the received electronic communication;
- based on the determination of the user intention to access the received electronic communication, determining a context associated with the received electronic communication using natural language processing and machine learning;
- in response to determining the context associated with the received electronic communication, scanning and determining a second context associated with unaccessed electronic communications on the electronic communication platform and on the different electronic communication platforms to identify the unaccessed electronic communications related to the determined context associated with the received electronic communication;
- in response to identifying an unaccessed electronic communication related to the determined context associated with the received electronic communication, consolidating the identified unaccessed electronic communication with the received electronic communication to generate a consolidated communication; and
- presenting, on the electronic communication platform, the consolidated electronic communication comprising the received electronic communication and the identified unaccessed electronic communication.

16. The computer program product of claim 15, wherein the program instructions to determine the context, further comprises:
- identifying and classifying different parts of the received electronic communication; and
- wherein the different parts of the received electronic communication are selected from a group comprising text, images, video, sender information, recipient information, metadata, and timestamp data.

17. The computer program product of claim 16, wherein the program instructions further comprise:
- comparing the determined context associated with the received electronic communication to the second context of each of the unaccessed electronic communications to determine whether the unaccessed communications relate to the received electronic communication.

18. The computer program product of claim 15, wherein the identified unaccessed electronic communication is from one of the different electronic communication platforms.

19. The computer program product of claim 15, wherein the program instructions to consolidate the identified unaccessed electronic communication with the received electronic communication further comprises:
- extracting and importing content associated with the identified unaccessed electronic communication into the electronic communication platform associated with the received electronic communication.

20. The computer program product of claim 19, wherein the program instructions to present the consolidated electronic communication further comprises:
- presenting the extracted and imported content associated with the identified unaccessed electronic communication with the received electronic communication in response to the user accessing the received electronic communication and in a window specifically associated with the received electronic communication on the electronic communication platform.

* * * * *